United States Patent [19]

Schwartz

[11] Patent Number: 5,539,842
[45] Date of Patent: *Jul. 23, 1996

[54] METHOD AND APPARATUS FOR COMPRESSING AND DECOMPRESSING IMAGES OF DOCUMENTS

[75] Inventor: Edward L. Schwartz, Sunnyvale, Calif.

[73] Assignees: Ricoh Corporation, Menlo Park, Calif.; Ricoh Company, Ltd., Tokyo, Japan

[*] Notice: The term of this patent shall not extend beyond the expiration date of Pat. No. 5,432,870.

[21] Appl. No.: 328,370

[22] Filed: Oct. 25, 1994

Related U.S. Application Data

[63] Continuation of Ser. No. 86,184, Jun. 30, 1993, Pat. No. 5,432,870.

[51] Int. Cl.⁶ .............................. G06K 9/36; G06K 9/46
[52] U.S. Cl. .................... 382/232; 382/233; 382/260; 348/432
[58] Field of Search .................... 382/232, 234, 382/237, 250, 260, 264, 268, 233; 358/262.1, 429, 432, 433

[56] References Cited

U.S. PATENT DOCUMENTS

| | | | |
|---|---|---|---|
| 4,266,249 | 5/1981 | Chai et al. | 358/429 |
| 4,578,704 | 3/1986 | Gharavi | 348/409 |
| 4,924,521 | 5/1990 | Dinan et al. | 382/254 |
| 4,945,351 | 7/1990 | Naiman | 345/147 |
| 5,432,870 | 7/1995 | Schwartz | 382/232 |

OTHER PUBLICATIONS

Kuwata, Naoki et al., "A New B–Level Quantizing Method For Document Images", IEEE Transactions on Comsumer Electronics, vol. 38, No. 3, Aug. 1992 pp. 718–724.
Rollins, Michael et al., "Possible Harmonic–Wavelet Hybrids In Image Compression", IEEE, 1992, pp. 191–198.
Lameillieure, J. et al., "Vector Quantization Based On Visual Masking Functions For The DPCM and HDPCM Coding Of Coloured Pictures", Belgium, pp. 548–552, (date unknown).
Japio—Patent Abstracts of Japan, Oct./1976–Oct. 1992.

*Primary Examiner*—Leo Boudreau
*Assistant Examiner*—Phuoc Tran
*Attorney, Agent, or Firm*—Blakely, Sokoloff, Taylor & Zafman

[57] ABSTRACT

A method and apparatus for compressing images having a binary extractor, a binary compressor and a JPEG compressor. The binary extractor produces a binary image representing an estimate of the binary information in the original image. The binary image is compressed by the binary compressor. The binary image is also subtracted from the original image to produce a difference image representing the continuous-tone information in the original image. The difference image is then compressed using the JPEG compressor. In this manner, the present invention compresses a document image without having to perform segmentation on the image.

8 Claims, 10 Drawing Sheets

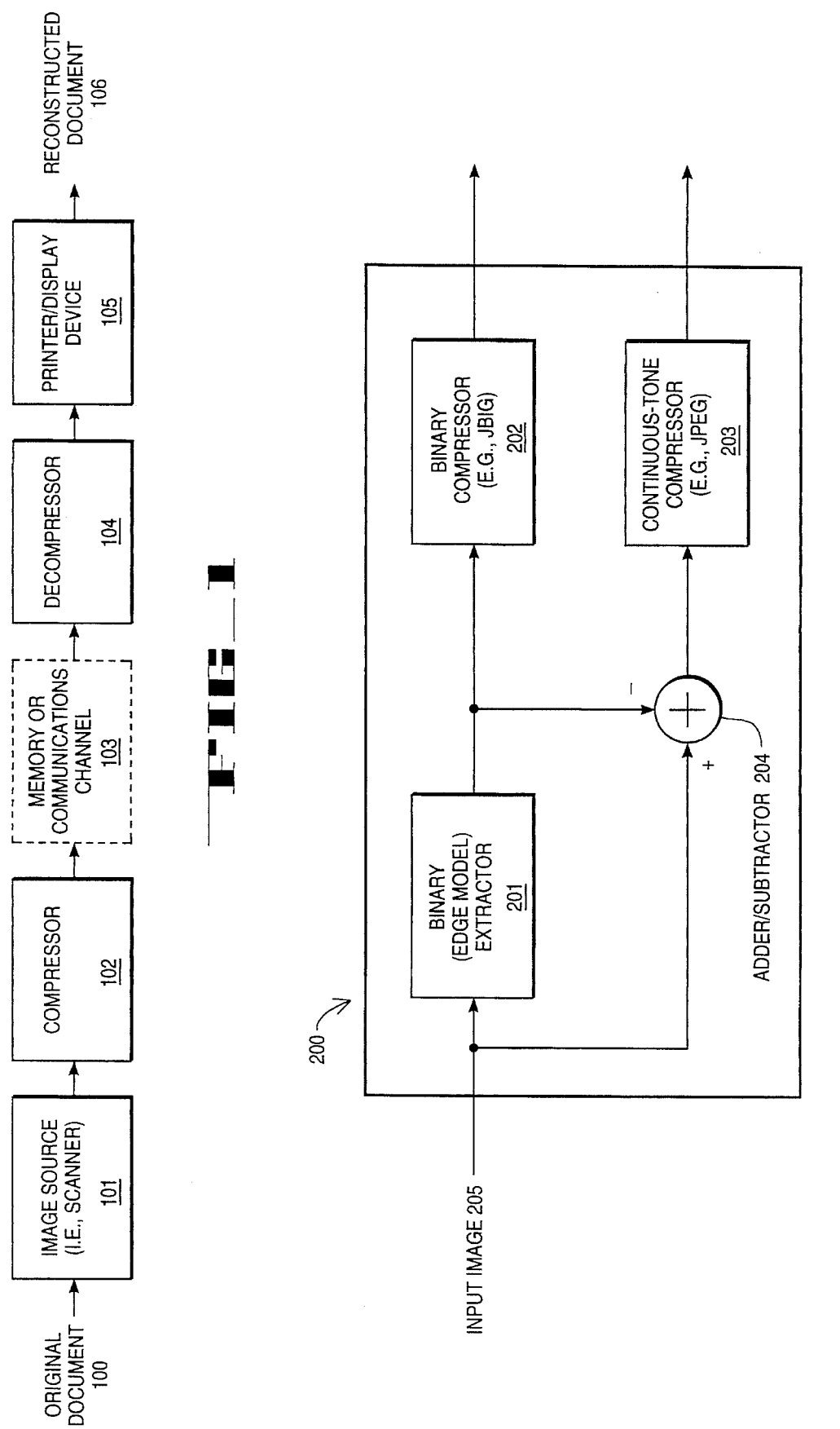

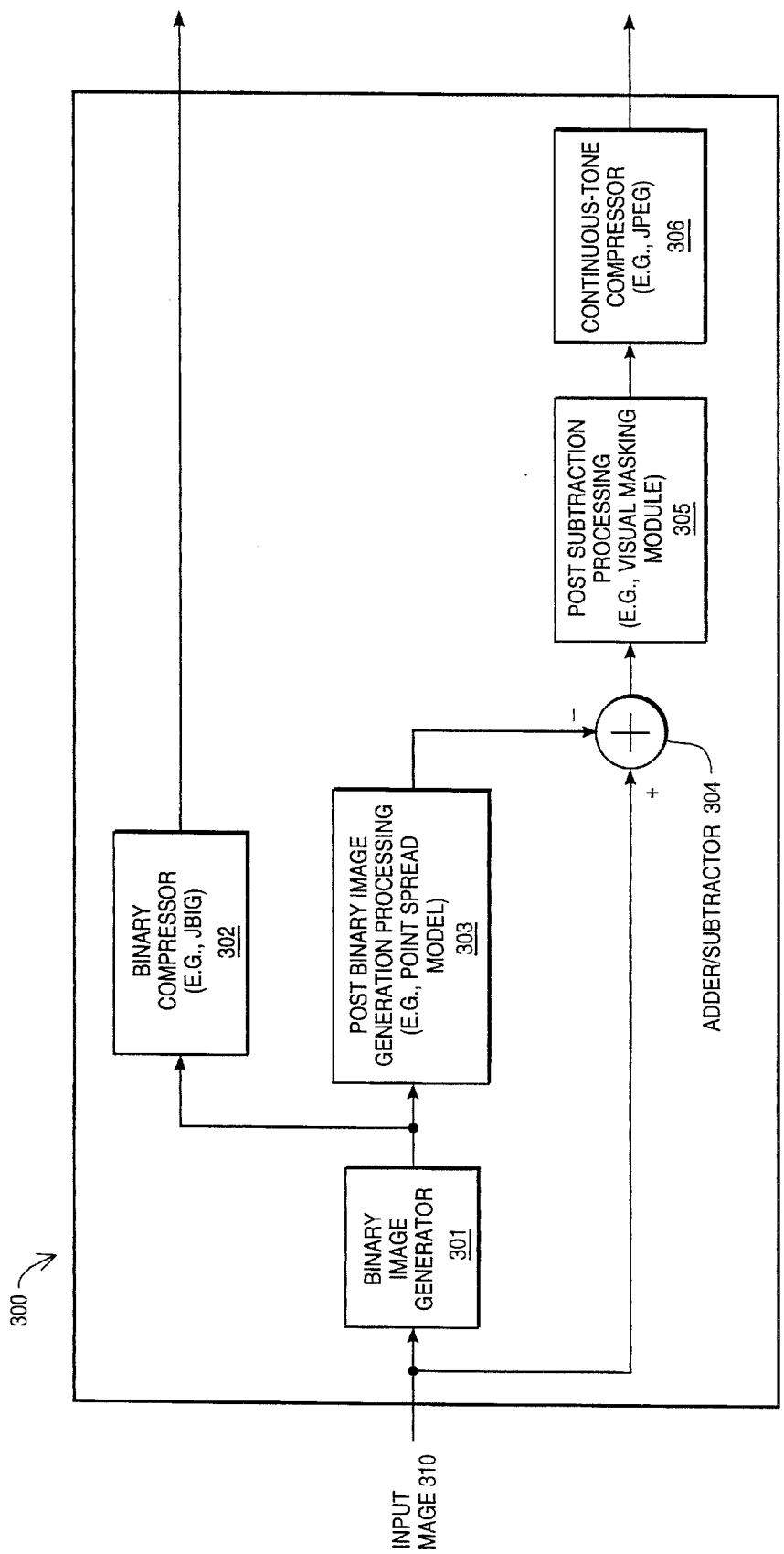

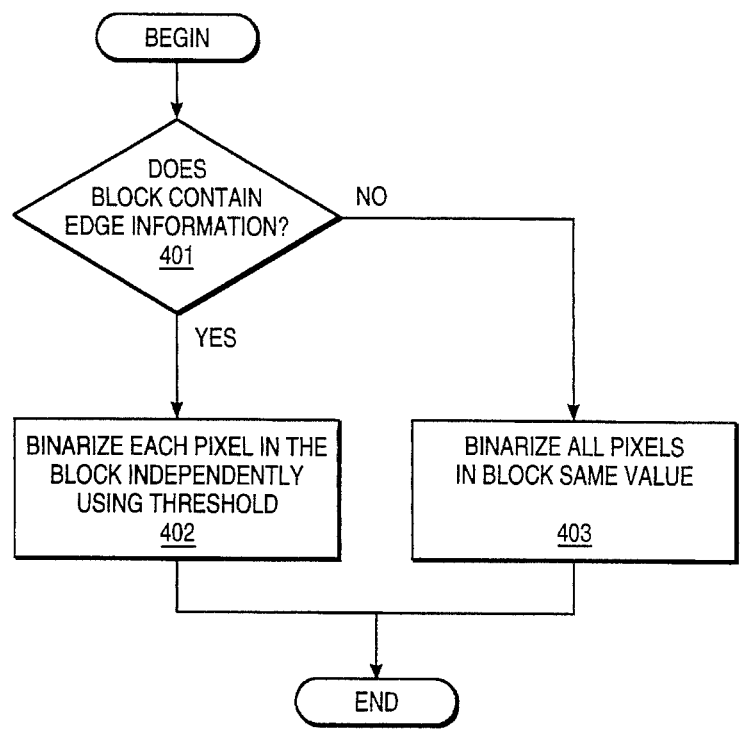
FIG_4
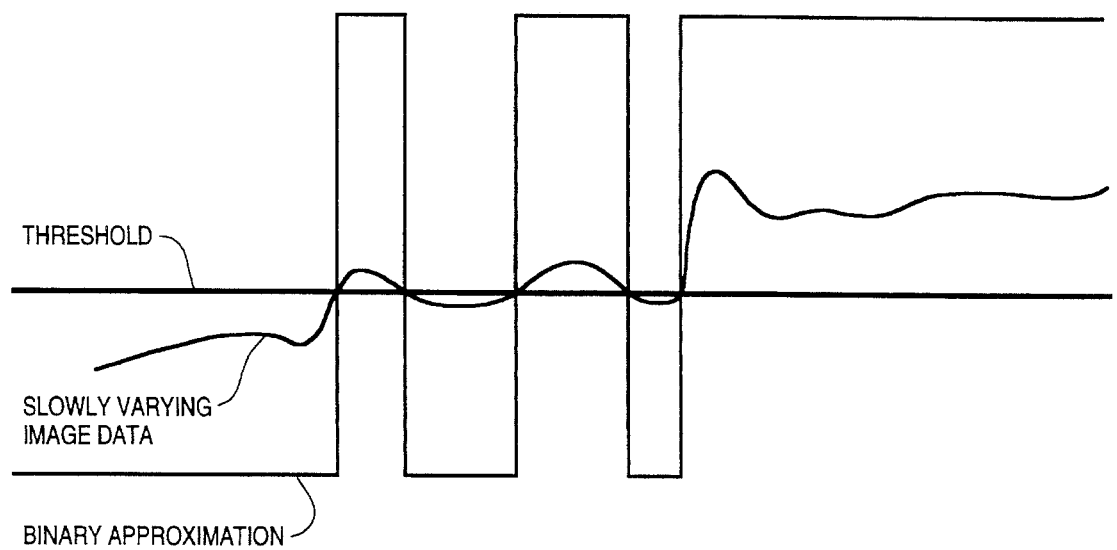
FIG_5

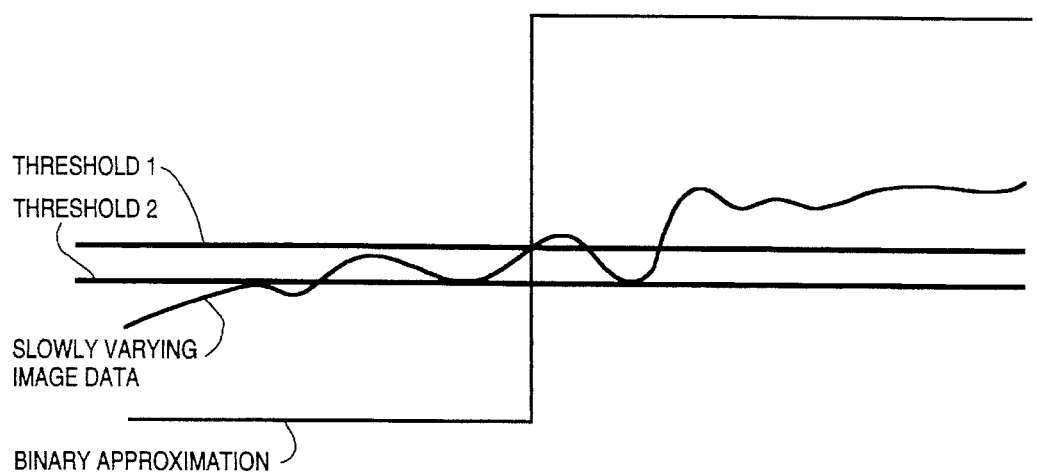
FIG_6
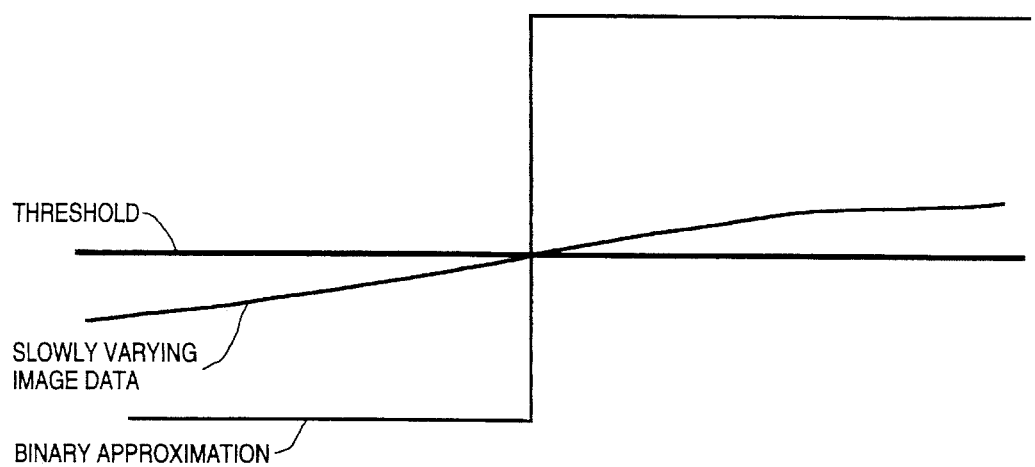
FIG_7
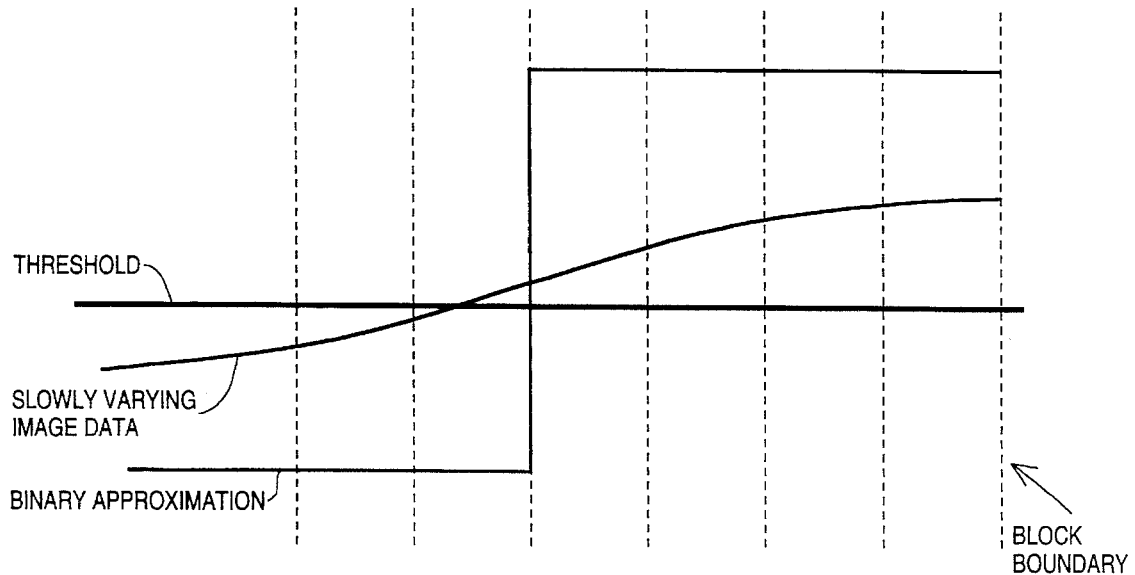
FIG_8

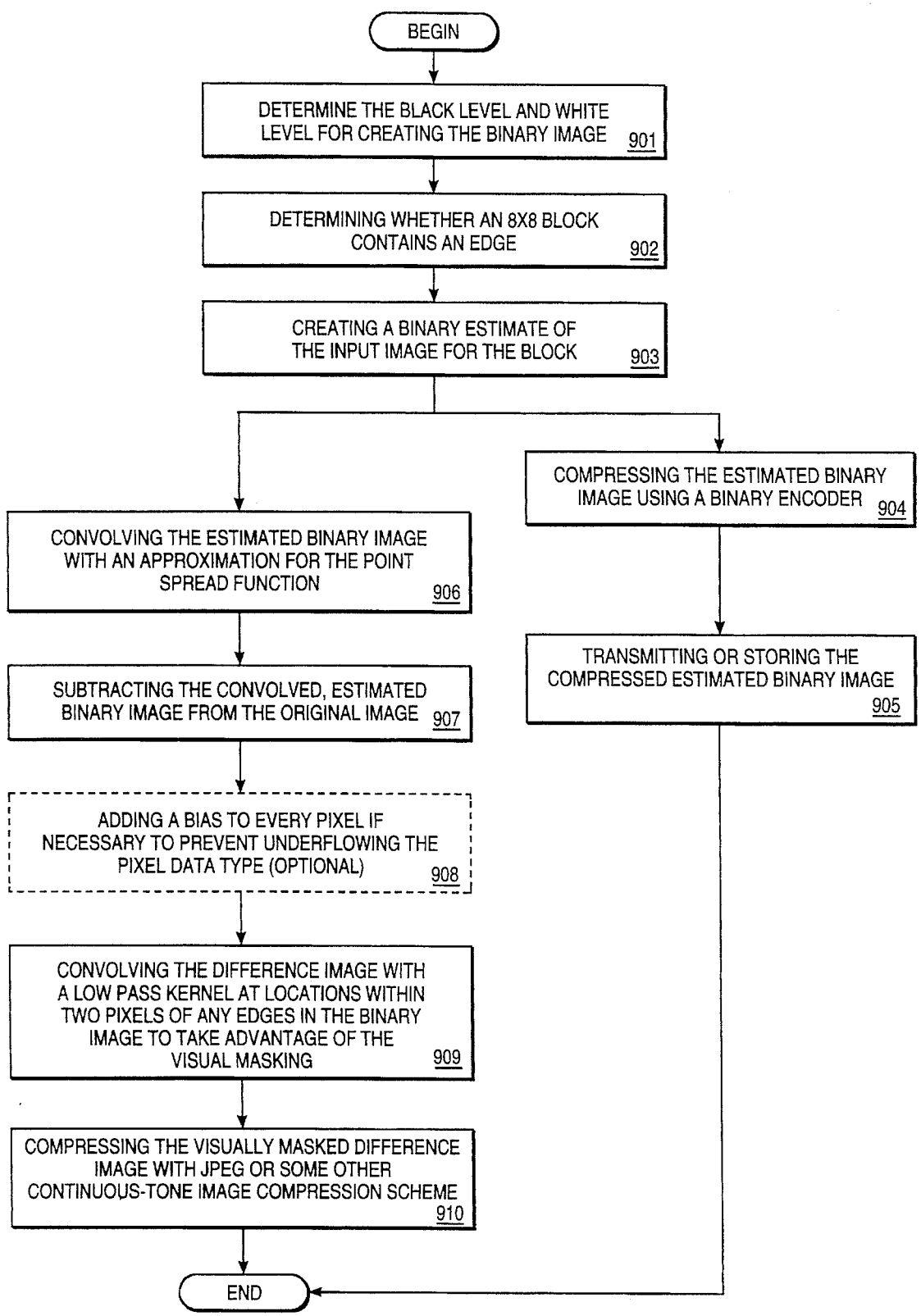
FIG_9

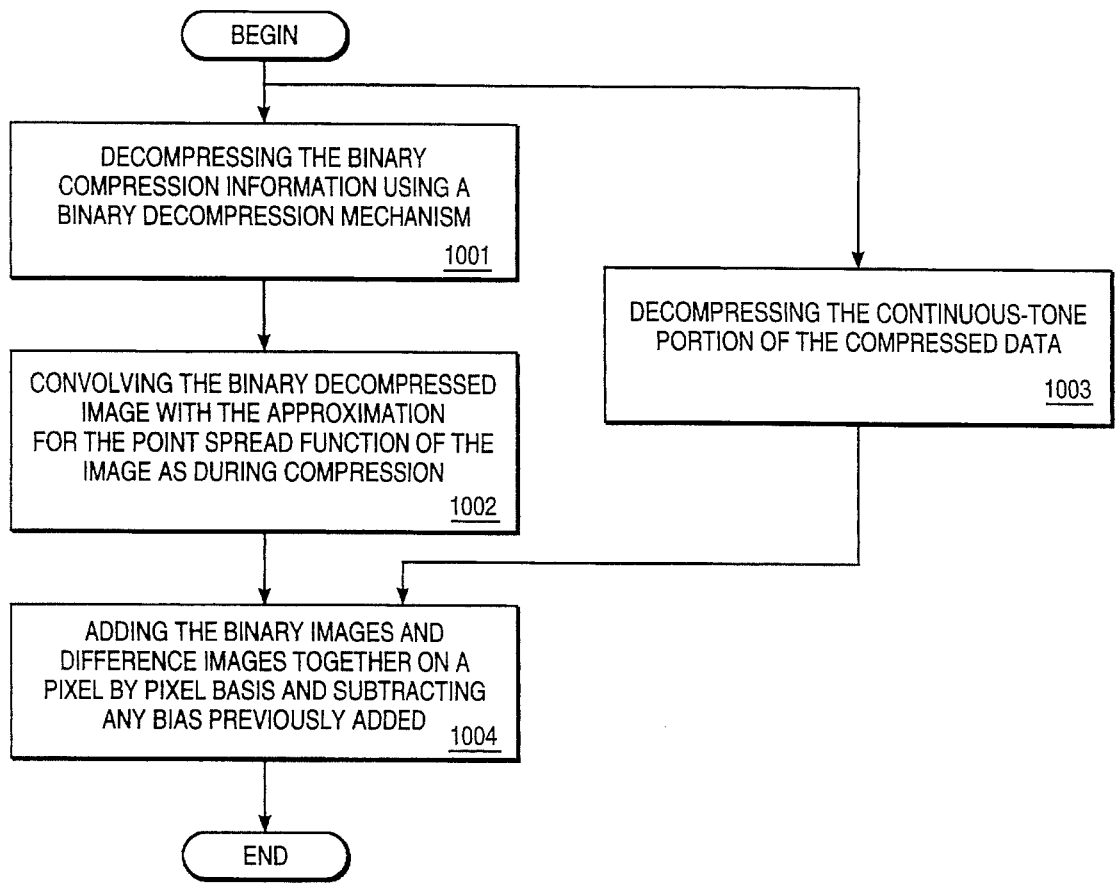
FIG_10
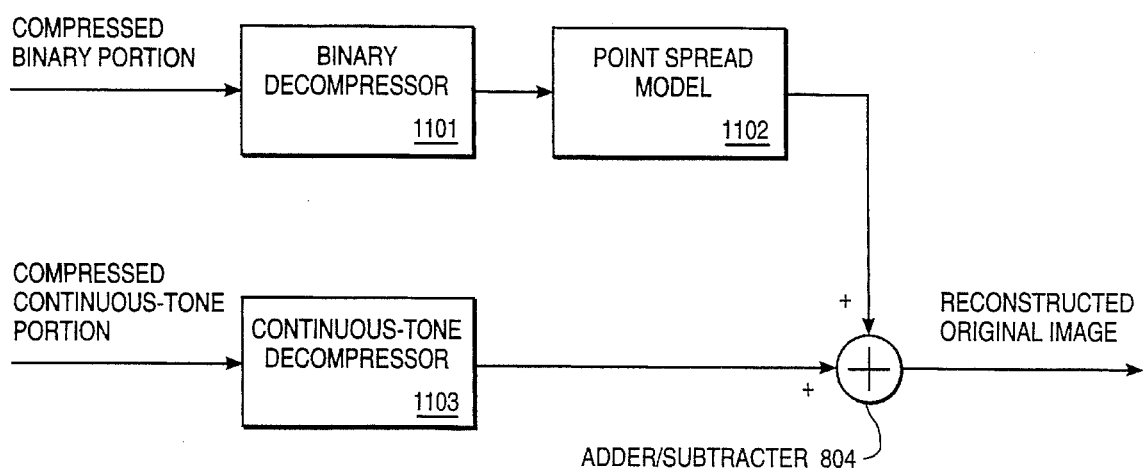
FIG_11

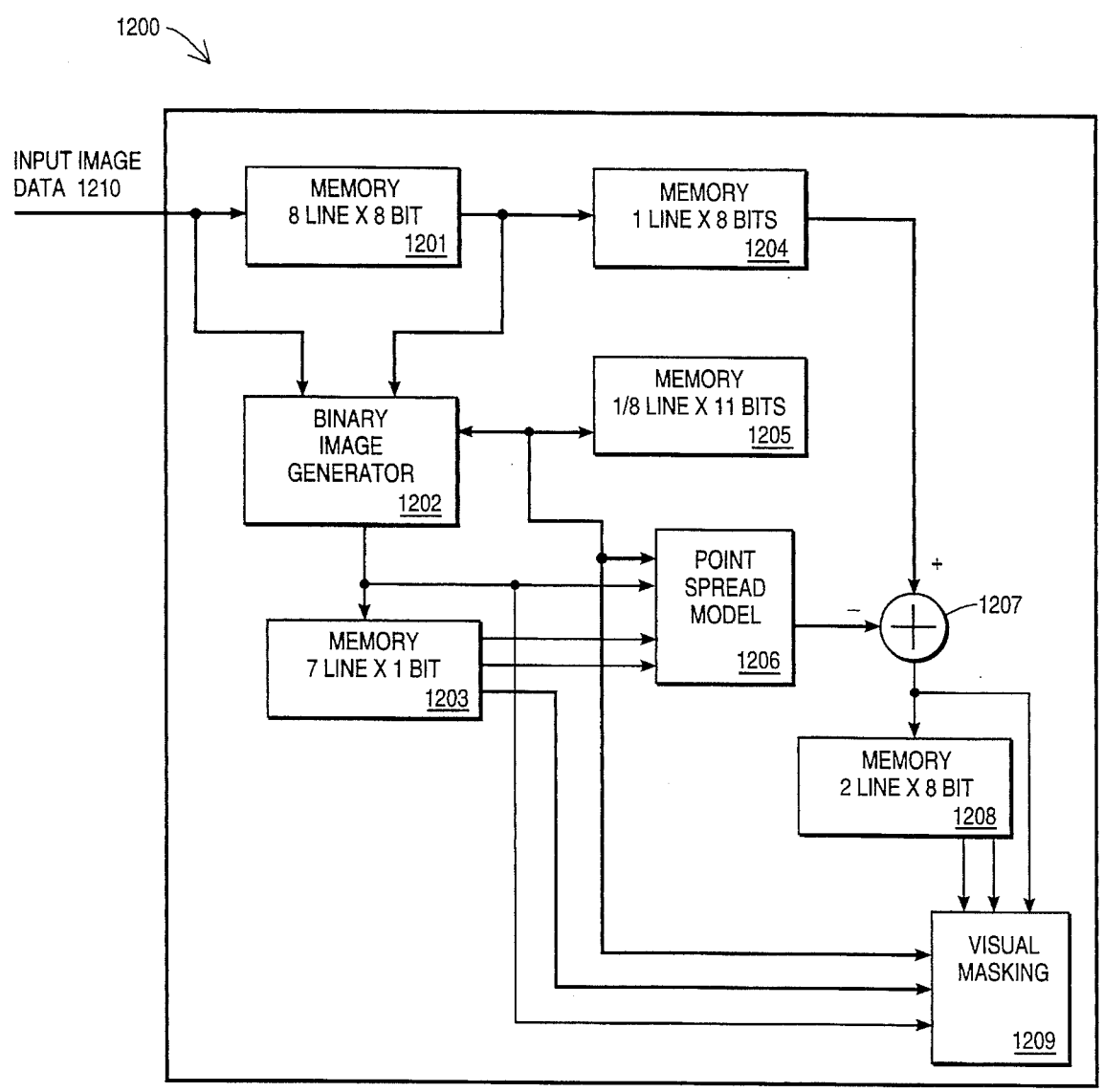
FIG_12

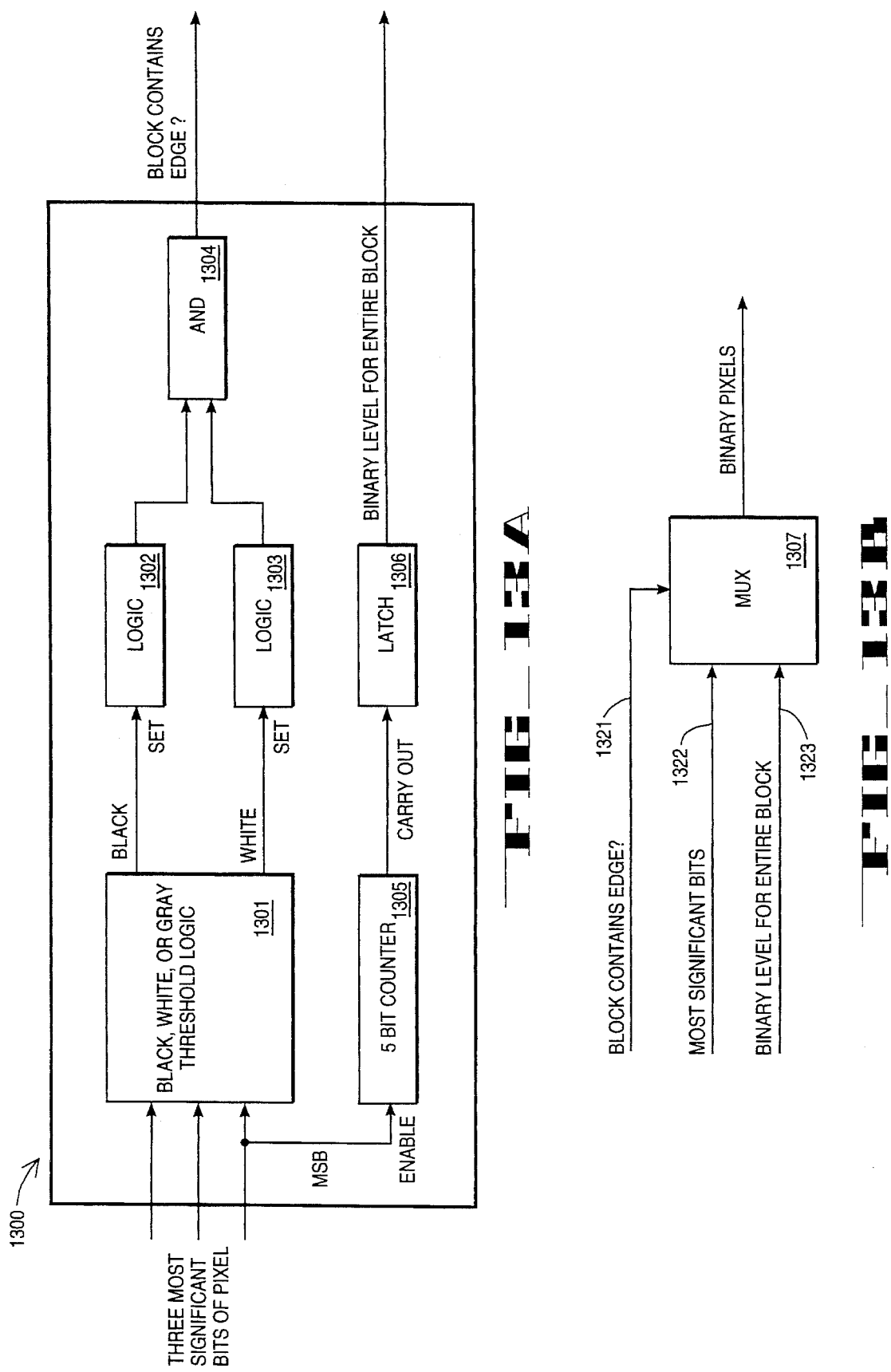

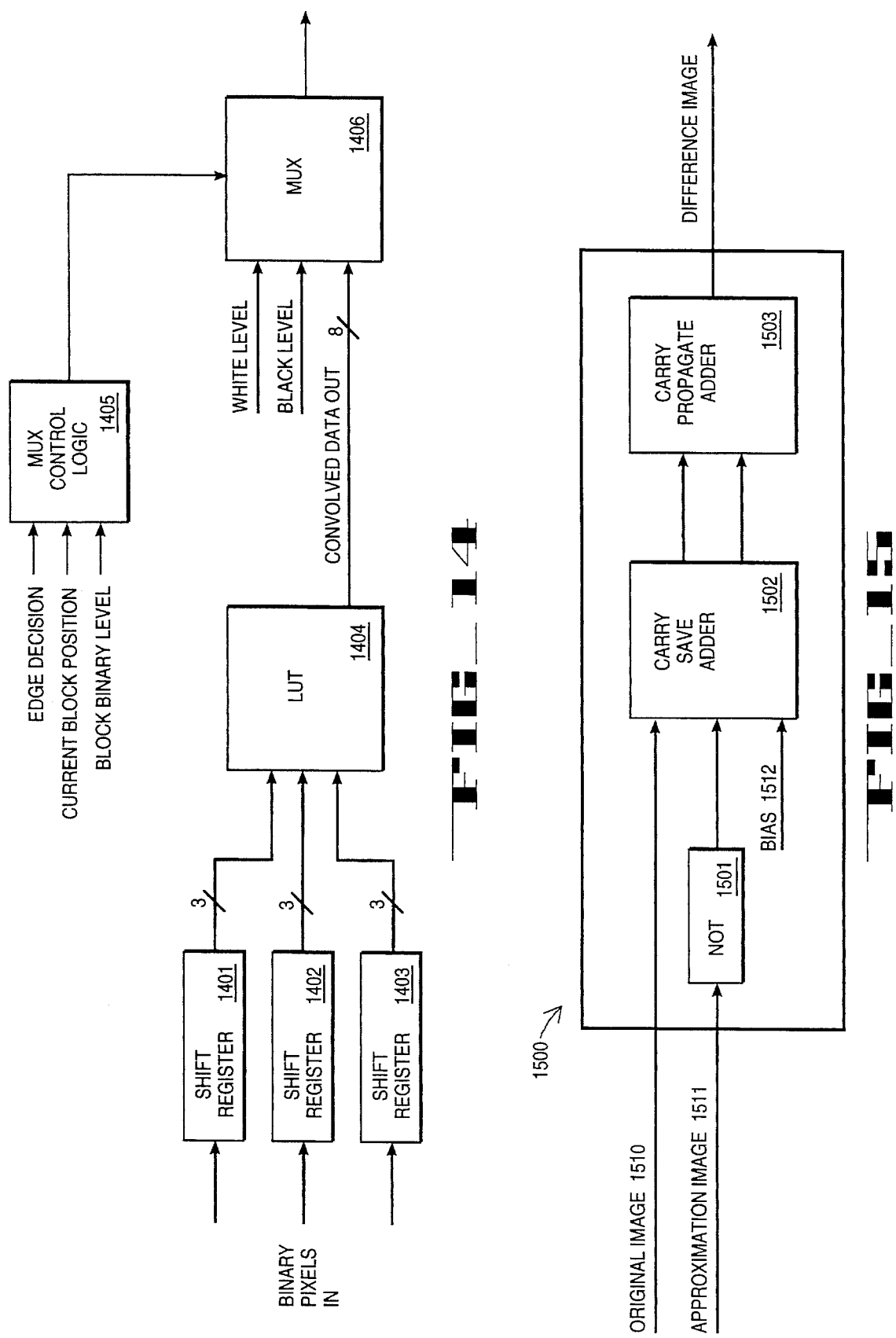

METHOD AND APPARATUS FOR COMPRESSING AND DECOMPRESSING IMAGES OF DOCUMENTS

This is a continuation of application Ser. No. 08/086,184, filed Jun. 30, 1993, now U.S. Pat. No. 5,432,870.

FIELD OF THE INVENTION

This invention relates to the compression and decompression of images having of sharp text or line-art and graphics and smooth continuous-tone regions; particularly, this invention relates to compressing images with text and continuous-tone portions using a multi-stage compressor comprising a binary image extractor, binary image compressor, and a continuous-tone image compressor.

BACKGROUND OF THE INVENTION

Digital image compression methods are used widely to compress many types of documents. For example, digital image compression is often used in facsimile machines. Future applications of digital image compressor may include digital copiers and document image archiving systems. Some document images may include sharp regions containing text and regions containing smooth continuous-tone images. The image compression methods of the prior art attempt to provide high quality and high compression ratio for both sharp text regions and smooth continuous-tone regions in a document. These documents are hereinafter referred to as document images.

Two well-known types of prior art image compression methods are lossless binary image compression methods and lossy continuous-tone compression methods. An example of lossless binary image compression is the JBIG standard. An example of a lossy continuous-tone compression method is the baseline Joint Photographic Expert Group (JPEG) standard. However, each of these methods when used alone do not provide high quality and high compression ratio for both text and continuous-tone regions. Specifically, binary image compression methods alone, such as those used for facsimile, cannot describe continuous-tone regions. On the other hand, transform-based continuous-tone compressors typically use lossy compression methods that have difficulty representing the high frequency edges found in text or line-art and graphics. For instance, the JPEG continuous-tone still image compression standard uses a discrete cosine transform (DCT) to achieve energy compaction. High contrast edges present in text are not modeled well by cosine-based functions. When using JPEG with quantization, the compression of the image regions produces a high compression ratio. However, undesirable noise is created in text regions at the same time, sometimes called artifacts. This noise is high frequency ringing and is sometimes referred to as "mosquito noise". Mosquito noise is caused by excessive quantization of the high spatial frequency content of the edges in the text. It is desirable to be able to compress (and decompress) documents having text and continuous-tone images such that the mosquito noise is eliminated or reduced.

A prior art technique for achieving good performance when compressing document images is referred to as post-processing. Post-processing is used to reduce noise created by quantization in a continuous-tone compressor. For instance, JPEG noise in text regions can be reduced by a post-processing after decompression. Note that in the prior art, linear, non-linear and/or adaptive filtering are used in post-processing as well as model based approaches. The primary disadvantage of post processing is that since the correct image is not available to the post-process, it must estimate what is noise and what is the proper image. Poor estimates will result in poor image quality. In some prior art applications, such as document archiving, an image is compressed once but decompressed many times, such that the overall cost of post-processing is multiplied. Due to these disadvantages, it is desirable to provide for compression of a document without having to perform post-processing on the image data during decompression.

Another prior art approach to achieving good performance when compressing document images is referred to as pre-processing. In pre-processing, the lossy compressor only processes data that it handles well, while other compression methods handle the remaining data. For instance, pre-processing can be used to separate the information in the image so that one type of compressor compresses one type of information and another compressor compresses the remaining information. One prior art method of pre-processing is referred to as segmentation, wherein the image segmented into text regions and image regions. Explicit segmentation is described in N. Kuwata, Y. Murayama, S. Ilno, "A New Bi-Level Quantizing Method For Document Images," IEEE Transactions on Consumer Electronics, Vol. 38, No. 3, (August 1992). However, segmentation is difficult to do quickly and accurately. For some documents, spatial segmentation is reasonable, because text regions consist of fully saturated background and foreground colors and images are spatially separated from text. However, other documents have images as background for text or text that does not use a single color for the foreground. Thus, some documents contain regions that are impossible to segment properly. In cases where spatial segmentation is difficult or impossible, good compression cannot be obtained with methods requiring segmentation. A scheme with segmentation must either tolerate mistakes due to incorrect segmentation or must compress the entire image with multiple techniques to make segmentation mistakes user correctable. Because of these limitations, it is desirable to perform compression (and decompression) on document images using a scheme that avoids having to segment the document images into text and continuous-tone regions.

The present invention uses a multistage approach that combines two compression schemes without explicit spatial segmentation to provide compression of document images. First, in the present invention, an image that may be compressed by a compression scheme is created. For document images, the present invention produces an approximation of the image that describes the binary information in the image. The binary information (i.e., the approximation) can be compressed with a binary or model based compressor. Next, the image representing the binary information is subtracted from the original to create a difference image. This results in a difference image that contains little of the high frequency edge information that was present in the original image. The difference image is compressed by a continuous-tone image compressor, such as JPEG. Similarly, in the present invention, decompression comprises summing the decompressed binary information and the decompressed difference image to form the original document image.

SUMMARY OF THE INVENTION

It is an object of the invention to provide high quality and high compression of document images.

It is another object of the invention to reduce visible errors (e.g., artifacts) that may result from the compression of document images.

It is yet another object of the invention to avoid segmenting images into text and image regions to compress the document image.

It is still another object of the invention uses industry standard compressors (decompressors) as modules, such as JPEG, JBIG, or MMR.

These and other objects are provided by a method and apparatus for compressing and decompressing document images. The present invention includes a method and apparatus for extracting binary information from an input image. This binary extraction mechanism generates a binary image representing an estimate of the binary information in the input image. The binary extraction mechanism also generates a difference image representing continuous-tone information in the input image. The difference image represents the difference between the input image and a smoothed version of the binary image, where the binary image has been subjected to an approximation of the point spread model of the image source (perhaps a scanner). The difference image is then subjected to visual masking to eliminate the high frequency components created by mismatch of binary edges. A binary compressor then compresses the initially created binary image and a continuous-tone compressor compresses the visually masked difference image, such that the input image is compressed.

Decompression is accomplished in reverse, where separate decompressors decompress the compressed binary image and the compressed continuous-tone information. Then the decompressed binary image is processed by the point spread model. Finally, the decompressed continuous-tone image is added to the smoothed binary image to reconstruct the input image.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of the system of the present invention.

FIG. 2 is a block diagram of the multi-stage compressor of the present invention.

FIG. 3 is a more detailed block diagram of the multi-stage compressor of the present invention.

FIG. 4 is a method employed by the binary image generator of the present invention.

FIG. 5 illustrates a poor one dimensional binary image generation due to the small intensity changes around the threshold.

FIG. 6 illustrates an example of one dimensional binary image generation according to one embodiment of the present invention.

FIG. 7 illustrates an example of poor one dimensional binary image generation due to an intensity ramp crossing the threshold.

FIG. 8 illustrates an example of binary image generation for an intensity ramp according to one embodiment of the present invention.

FIG. 9 illustrates the compression process of the present invention.

FIG. 10 illustrates the decompression method of the present invention.

FIG. 11 is a block diagram of the decompressor of the present invention.

FIG. 12 illustrates the binary extractor of the present invention.

FIGS. 13A and 13B illustrate the binary image generation hardware of the present invention.

FIG. 14 is a block diagram of the point spread model hardware of the present invention.

FIG. 15 is a block diagram of the adder/subtracter hardware of the present invention.

DETAILED DESCRIPTION OF THE PRESENT INVENTION

Figure 16:
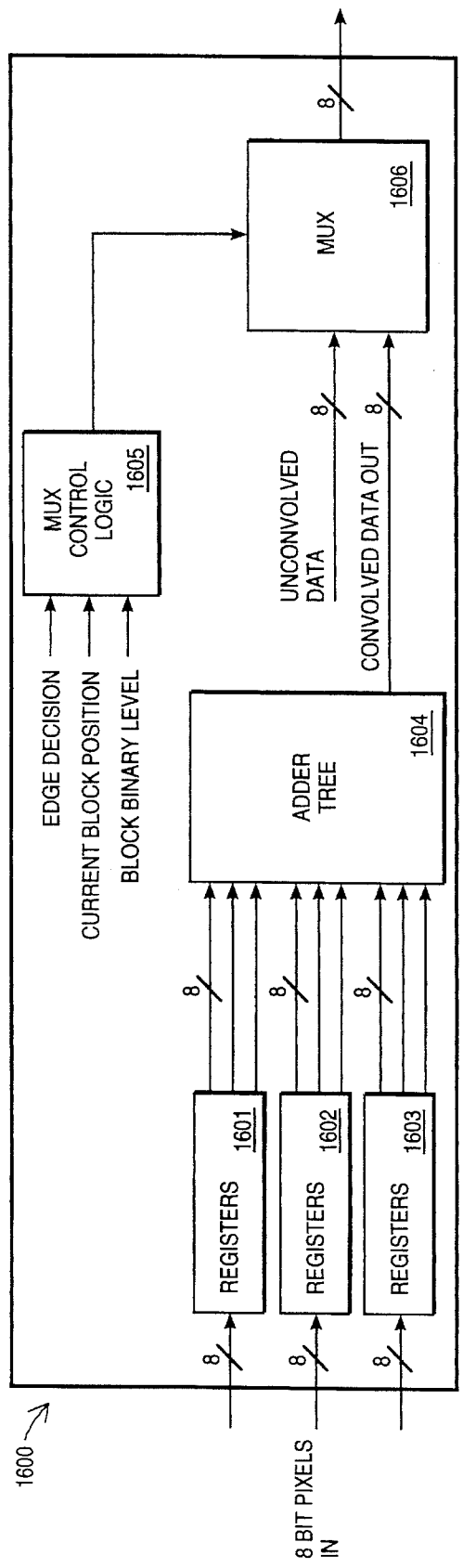
FIG. 16 is a block diagram of the visual masking hardware of the present invention.

A method and apparatus for performing image compression and decompression is described. In the following detailed description of the present invention numerous specific details are set forth, such as specific compression methods and hardware, specific numbers of bits, specific convolution sizes and matrices, etc., in order to provide a thorough understanding of the present invention. However, it will be obvious to one skilled in the art that the present invention may be practiced without these specific details. In other instances well known methods, functions, components and procedures have not been described in detail as not to unnecessarily obscure the present invention.

Nomenclature

The following terms are used below:

A continuous-tone image (or contone image) is either a grayscale or true color image (N bits per color band). Pixels in continuous-tone images have many intensity levels. A typical grayscale image might represent pixels with 8 bits. A typical true color image might represent pixels with 24 bits (8 bits per color band). In this invention, three types of continuous-tone images are used: original images, smoothed binary images and difference images.

A binary image consists of pixels that are represented by 1 bit, i.e. each pixel is either 0 or 1. Binary images are sometimes referred to as bi-level images. A binary image can be combined pallete which assigns different intensity levels (or colors) to 0 pixels and 1 pixels. This is a compact way of representing a continuous-tone image that has only two intensities (or colors). This pallete could map a 0 pixel into a contone gray level below 128, for example, that is called a "black level". Likewise, a 1 pixel could be mapped to a contone gray level above 128 and called a "white level". (Of course, the assignment of 1 pixels to black and 0 pixels to white may also be used.)

A point spread function is the physical property of an imaging device that describes the blurring caused by the device. A point spread filter is an image processing function which models a point spread function.

Visual masking is the property of the Human Visual System (HVS) that people are insensitive to small intensity changes at edges. A visual masking function is a mathematical or empirical definition of this property in a model of the HVS. A visual masking filter is an image processing function which exploits a visual masking function to perform processing that (according to a HVS model) human observers will be unable to detect.

Binary images and bi-level images have well defined edges. In these images, an edge exists between any two pixels of different values. Edges for continuous-tone images are less well defined; definitions can be based on human perception or on a particular model. Edges in continuous-tone images are large magnitude intensity (or color) changes that extend over a small number of pixels. This invention uses binary approximations of continuous-tone images. Any edge in a bi-level approximation image that does not correspond to an edge in the original continuous-tone image is referred to in this invention as an artificial edge. In one embodiment of this invention, artificial edges only occur at transform block boundaries.

Compression/Decompression System Of The Present Invention

FIG. 1 illustrates the compression/decompression system of the present invention. The system depicted in FIG. 1 could comprise a digital photocopier, facsimile, document archiving system, or other system where the compression, and subsequent decompression, of images is required. Referring to FIG. 1, the compression/decompression system includes scanner or other image source 101, compressor 102, memory 103 (optional or communication channel), decompressor 104 and printer/display device 105. Image source 101 scans original document 100 into image data. The image data may comprise gray scale image data in one embodiment or color image data in another. The output of image source 101 (i.e., the scanned image data) is coupled to an input of compressor 102. Compressor 102 of the present invention is a multistage compressor which performs compression using multiple compression schemes, each designed to provide good compression for a particular type of data (e.g., text, image, etc.) such that compressor 102 produces multiple outputs. Compressor 102 then outputs the compressed data on transmission media. The compressed image data may be stored in a memory, such as memory 103. The compressed image data is then coupled to and decompressed by decompressor 104. Decompressor 104 is a multistage decompressor which includes mechanisms to decompress both the sharp and smooth continuous-tone image regions of a document separately. The results of the decompression output from decompressor 104 are coupled to be received by a printer or display device 105 for viewing as reconstructed image 106.

Multistage Image Compressor

FIG. 2 illustrates the multistage image compressor of the present invention. Referring to FIG. 2, multistage compressor 200 comprises binary extractor 201, binary compressor 202, adder/subtracter 204 and continuous-tone compressor 203. A binary extractor 201 is coupled to receive an input image 205 and produces a binary approximation image of input image 205. The binary image extractor 201 determines what information the two compression modules (i.e., binary compressor 202 and continuous-tone compressor 203) process. Binary extractor 201 creates an estimate of the binary information in input image 205 for compression by binary compressor 202. That is, binary extractor 201 outputs a binary image containing edge information in input image 205. The binary image is coupled to the input of binary compressor 202. Binary compressor 202 compresses the binary image, including the edge information, and outputs the compressed binary image (i.e., the edge information). The binary image is also extracted (i.e., subtracted) from input image 205 by adder/subtracter 204. The resulting difference is an image comprising the continuous-tone information. The resulting difference image output from adder/subtracter 204 is coupled to the input of continuous-tone compressor 203. Compressor 203 compresses the image. In one embodiment, continuous-tone compressor comprises a JPEG compressor. In one embodiment, binary image extractor 201 is matched to the characteristics of continuous-tone compressor 203 to avoid causing artifacts. For example, if continuous-tone compressor 203 comprises a JPEG compressor, then binary extractor 201 is matched to the JPEG characteristics to avoid causing JPEG artifacts.

Note that the multistage approach of the present invention allows for industry standard compressors to be used as modules. For instance, as stated previously, a JPEG compressor may be used. In addition to using JPEG compressor, a binary compressor such as Joint Binary Industry Group (JBIG) or Modified-Modified READ (Relative Element Address Designate) (MMR) may be used. In another embodiment, the binary compressor may be a LZW (Lempel-Ziv-Welch) compressor. Since industry standard compressors may be used in the present invention, the expense with designing complicated circuits and logic blocks to implement the compression and coding of the present invention is avoided. Furthermore, in a multi-function machine, the same hardware could support JPEG or binary compression alone for communication purposes in addition to use in multistage compression scheme of the present invention.

Note that the multistage approach of the present invention does not necessarily provide better image quality with respect to the mean squared error (MSE), signal-to-noise ratio (SNR), or peak signal-to-noise ratio (PSNR). The multistage approach of the present invention takes advantage of the fact that errors in the background of text regions are easily seen while errors at edges are not. By eliminating visible errors and creating non-visible errors, the present invention is able to provide high quality and high compression rate for document images. Although the result might have an increase in MSE (or other objective measure) than JPEG, the perceived image quality is increased.

The creation of an image that contained the binary portion of a documented image and a difference image consisting of the continuous-tone information is non-trivial. In the present invention, binary image extractor 201 prevents the continuous-tone image regions from causing noisy binary images. Furthermore, binary image extractor 201 avoids artificial image features in the difference image that would reduce JPEG compression performance. In the present invention, binary image extractor 201 also handles the point spread of the image source properly. Also, the binary image extractor 201 does not create high frequency information which decreases the compression efficiency of JPEG during the subtraction of the binary image from the original.

Note that the binary image extraction 201 can handle color images in multiple ways. In one embodiment, all components of an image may be processed with the multistage approach of the present invention. Each component may be used to generate a separate binary image and difference image. Alternatively, the luminance component of an image may be processed using the multistage approach, while the chrominance component is compressed using a continuous-tone compressor (e.g., JPEG) alone.

FIG. 3 is a more detailed block diagram of the multistage compression system of the present invention. Referring to FIG. 3, compressor 300 comprises binary image generator 301, binary compressor 302, post binary image generation processing 303, adder/subtracter 304, post subtraction processing 305 and continuous-tone compressor 306. Binary image generator 301 is coupled to receive an input image 310 and generates a binary image as an output. Binary compressor 302 is coupled to receive the binary image output from binary image extractor 301. Binary compressor 302 compresses the binary image output from binary image generator 301. The output of binary compressor 302 is output from the multistage compressor as compressed binary data. The binary image output from binary generator 301 is also coupled to be received by post binary image generation processing block 303. In one embodiment, post binary image generation processing block 303 acts as a low pass filter to selected portions of the image, such that a "smoothed" binary image is produced.

Post binary image generation processing block 303 could include a point spread model. In effect, the point spread model models blurring in the input device (e.g., the scanner). The output of post binary image generation processing block 303 is coupled to an input of adder/subtracter 304. The other input to adder/subtracter 304 is coupled to receive input image 310. Adder/subtracter 304 produces a difference image comprising the difference between the original input image 310 and the smoothed binary image output from post binary image generation processing block 303. This resulting difference image represents the continuous-tone information in the input image 310. The output of adder/subtracter 304 is coupled to an input of post subtraction processing module 305. Post subtraction processing module 305 removes the pixel information remaining after the differencing due to the fractional misalignment of the binary image and the original input image (i.e., the visually irrelevant high frequency components from the difference image). In one embodiment, post subtraction processing module 305 comprises a visual masking module. The output of post subtraction processing module 305 is coupled to the input of continuous-tone compressor 306. In one embodiment, continuous-tone compressor comprises a JPEG compressor. Note that any continuous-tone image compressor could be used in place of JPEG compressor module 306. The output of continuous-tone compressor 306 is output from multistage compressor 300.

Binary Image Generation

Binary image generator 301 of the present invention determines which blocks contain binary information edges and binarizes all block according to whether or not they contain edges. Therefore, there are two steps: first the decision then the dependent binarization. Initially, binary image generator 301 determines which blocks have edges and determines a representative binary value for the entire block. Binary image generator 301 uses thresholds to determine whether there is edge information in a particular block. In the present invention, a black threshold level and a white threshold level are used when creating the binary image are determined. In other words, a threshold is set up to determine if a particular pixel is black and another threshold is set up to determine if a particular pixel is white. For example, threshold pixel values of 96 and 160 might be chosen for pixel values ranging from 0–255. If a particular pixel has a value greater than or equal to 160, the pixel is considered white. If a pixel has a value less than or equal to 96, the pixel is considered black. Pixels with values between 96 and 160 are not considered in the edge decision and are referred to as gray pixels. Note that the specific threshold values used are application dependent. If pixel values were not 8-bits, then other threshold values would be used. Also, where a particular scanner recognizes a different black level and white level, then those recognized by the scanner would be used.

Once the black and white thresholds have been set, binary image generator 301 determines if each block contains an edge. Binary image generator 301 determines that an edge exists in a particular block by determining if there is at least one black pixel and at least one white pixel in the block.

After the determination of whether a block contains edges is complete, binary image generator 301 determines a representative binary value for the pixels in the block to create a binary estimate of the input image. In one embodiment, each of the pixels in the block are thresholded to form the binary estimate. For blocks with edges, each pixel in the block is thresholded independently. That is, the value of each pixel is compared to a threshold to binarize the pixel. For instance, if the pixel value is greater than the threshold, the pixel is estimated to be white. If the pixel value is less than the threshold, the pixel is estimated to be black. In one embodiment, for blocks with edges, if the threshold is 128/256, then individual pixels may be thresholded by outputting their most significant bit (MSB). For blocks without edges, in one embodiment, the entire block is threshold to the same value. The value may be the mean of the block. In another embodiment, the MSB of each pixel can be used to find a representative threshold value for the entire block. If half of the pixels in a block have their MSB equal to 1, the block is thresholded to 1; otherwise, the block is thresholded to 0. Thus, binary image generator 301 binarizes the pixel values to binary pixel values of one bit length.

FIG. 4 summarizes the method employed by the binary image generator 301 of the present invention. Binary image generator 301 considers every 8×8 block in the image and decides whether each block contains edge information or not (processing block 401). In one embodiment, a block with both a black pixel and a white pixel are considered as having edge information. This represents the edge model. Next, pixels in blocks containing edge information matching the edge model are binarized independently using a threshold (processing block 402). Every pixel in blocks that do not contain edge information are binarized to the same value (processing block 403). In one embodiment, the pixels in the block that do not contain edge information are binarized to a value that is closer to the mean of the block.

Instead of computing the mean, some less hardware intensive methods may be used. For instance, the thresholded value of the first pixel in a block could be used as the binary level for the entire block. In another embodiment, the most significant bit (MSB) for each pixel would represent a "vote" wherein the MSB value that is the MSB for the majority of pixels in the block is determined to be the winner, and the winner is used as the value for the whole block.

It should be noted that an optimal method could be used to decide which blocks contain edge information matching the model. In this embodiment, this system compresses and decompresses the data resulting from different decisions and choose the best results. However, note that this is a computationally expensive method.

The method employed by the present invention greatly reduces the problem of visually objectionable artifacts being generated in smooth portions of the image which have values around the binarization of the threshold.

Binary image generator 301 avoids producing binary edges for image data with small changes in amplitude around the binarization threshold value. An example of poor image generation due to the small intensity changes around the threshold is shown in FIG. 5. Note that when the pixel values vary closely above and below the threshold, the result can be a binary image with a large difference in binary values. In the present invention, binary image generator 301 uses the black and white threshold values as a form of hysterisis to reduce several binary edges to a single edge. In other words, the black or white level of the pixel must exceed their corresponding threshold level before being considered either a black or white pixel respectively.

FIG. 6 illustrates an example of binary image generation according to the present invention where two thresholds are used as a form of hysteresis. Referring to FIG. 6, due to the two thresholds, the slow varying data is reduced to a single binary edge, as opposed to the several binary edges that resulted as shown in FIG. 5.

Artificial edges may be caused by intensity ramps. An intensity ramp is a slowly varying region of the image that crosses the binarization threshold. When one side of an intensity ramp is binarized to black and the other is binarized to white, even though there is no edge in the image region, an artificial edge is created in a binary image, i.e., an edge that does not correspond to a true edge in the image. Properties of continuous-tone compressor, especially a JPEG compressor, can be used to handle intensity ramps.

In the present invention, binary image generator 301 creates a binary estimate of the original input image 310 that attempts to reduce decorrelation in the difference image that is output from adder/subtracter 304. Note that if a binary image of this type is subtracted from the original image, much of the correlation of the original image will be lost. Since JPEG compression relies on the input being closely modeled by cosine functions, a decorrelation of the image will result in degraded compression. Decorrelation in the difference image could be caused by artificial edges in the binary image. Artificial edges are generated by binary image generator 301 when creating the binary image due to a slowly varying region of the image that crosses the binarization threshold. The slowly varying image data is often referred to as an intensity ramp that crosses the threshold. In one embodiment, the continuous-tone compressor 306 is a block-based continuous-tone compressor, such as a JPEG compressor. Since JPEG uses 8×8 blocks, edges that fall across 8×8 boundaries cause a small reduction of JPEG performance. Thus, the present invention produces a binary image which aligns artificial edges on 8×8 boundaries. An example of the present invention aligning artificial edges on block boundaries is shown in FIG. 8. Referring to FIG. 8, an intensity ramp crosses the threshold. Although the intensity ramp does not cross the threshold at a block boundary, the binary approximation for the image data is made, such that the artificial edge created due to thresholding the image is aligned on a block boundary.

It Should be noted that other methods, such as model-based approaches like modified truncation codes, could also be used to produce the binary image. In one embodiment, binary image generator 301 produces a binary image with a reduced number of singleton pixels. A singleton pixel in a binary image is a 0 pixel surrounded by eight 1 pixels or a 1 pixel surrounded by eight 0 pixels. In images where all features are larger than one pixel, singleton pixels are undesired noise. Since the number of singleton pixels is reduced, the effectiveness of binary compressor 302 is increased.

In other embodiments, binarization methods that do not make use of blocks may be used. These methods are desirable when the continuous-tone compressor is not block-based. Poor binarization is detected and all pixels that cause poor binarization are set to a default value. For example, assume that the input document image is on white paper. This means that white binary pixels are the default and that the system must avoid poor binarization when deciding if a pixel should be black. A binary image is generated using a 50% threshold. The image is evaluated by examining connected black regions. A connected black region may be either four- or eight-connected, where a pixel is part of a region if either its four or eight closest neighbors are part of the region. (Fundamentals of Digital Image Processing, Anil. K. Jain, pp. 357–358). If any part of the edge of a black region deviates sufficiently from the edge model (which would be a poor binarization), the entire region is set to white. Note that the edge model is the edges generated when the point spread filter is driven by the binary input. Isolated black pixels (singleton pixels) can either be considered a region and tested against the edge model or can be set to white arbitrarily.

The Binary Compressor Of The Present Invention

After an estimated binary image is created by binary image generator 301, the estimated binary image is compressed using a binary encoder. Binary compressor 302 compresses the binary image. In one embodiment, binary compressor 302 comprises an industry standard binary compressor. For example, the JBIG or MMR compression standard could be utilized. In one embodiment, 8×8 blocks that are entirely black or white may be encoded with two bits while encoding other 8×8 blocks with 65-bits. For example, a code of "00" could be used to represent an all white block; a code of "01" could be used to represent an all black block; and a code of "1" followed by 64-bits describing the block is used for other blocks.

The compressed binary image is then transmitted and/or stored. In one embodiment, a fixed size buffer may be used for storing the compressed binary data. The size of the buffer can be chosen so that most images for a particular application may be handled. If an image requires more storage, thereby resulting in an overflow of the buffer, the remaining binary data can be assumed to be either all black or all white. The remaining portions of the image are compressed solely by the continuous-tone compressor.

The Point Spread Model Of The Present Invention

The estimated binary image produced by binary image generator 301 is also received by post binary image generation block, or point spread model, 303. Point spread model 303 convolves the estimated binary image with an approximation for the point spread function of the image system (printer and scanner). That is, point spread model 303 performs a convolution operation between the binary image and the point spread function of the scanner. The point spread function of the scanner may be known to point spread model 303 or may be determined. Note that in the present invention, this is required since a scanned input image does not contain any truly binary information.

Some of the edges in the binary image may not be due to edges in the input image. For instance, some of the edges may be due to neighboring 8×8 blocks that do not contain edge information but are binarized to different values because of different mean values. These edges are referred to as artificial edges. Point spread module 303 of the present invention detects 8×8 blocks that contain a constant binary value. In other words, point spread module 303 detects blocks that do not contain edge information. When two adjacent blocks do not contain edge information, convolution is not performed across their boundary. It should be noted that the convolution operation is possible when boundaries are formed between two blocks or between four blocks. Thus, convolution is not performed across artificial edges caused by adjacent blocks without edges. The result of the convolution process is a "smoothed" binary image where the effects of the scanner are simulated.

in one embodiment, point spread module 303 performs the convolution using a convolution kernel derived from a measurement of the point spread function. For instance, if a black dot the size of one pixel is surrounded by white, a review of a scanned input may indicate that the neighboring pixels are partially black. For example, a black dot may be scanned such that the intensity of the pixels in the neighborhood of the dot is as follows (where the 1 represents the pixel of the black dot):

$$
\begin{array}{ccccc}
0 & 0 & \frac{1}{10} & 0 & 0 \\
0 & \frac{1}{4} & \frac{1}{2} & \frac{1}{4} & 0 \\
\frac{1}{10} & \frac{1}{2} & 1 & \frac{1}{2} & \frac{1}{10} \\
0 & \frac{1}{4} & \frac{1}{2} & \frac{1}{4} & 0 \\
0 & 0 & \frac{1}{10} & 0 & 0
\end{array}
$$

A 5×5 point spread convolution kernel may be generated by normalizing all of the values to integers. In this case, multiplying by 20 produces a kernel of:

$$\frac{\begin{bmatrix} 0 & 0 & 2 & 0 & 0 \\ 0 & 5 & 10 & 5 & 0 \\ 2 & 10 & 20 & 10 & 2 \\ 0 & 5 & 10 & 5 & 0 \\ 0 & 0 & 2 & 0 & 0 \end{bmatrix}}{88}$$

Point spread model 303 performs the convolution using a predetermined and reasonable black level and white level for the image. In the present invention, the black level and the white levels may be assumed to be 0 and 255 respectively, thereby representing the ends of the possible color levels. The black level and white level may be determined by using a test image with known black and white regions. In this manner, the black level and the white level may be ascertained. A reasonable black level and a reasonable white level may be obtained by preparing a histogram on each image. In one embodiment, for 8-bit pixels, a scanner may not acquire images with a white pixel value equal to 255 and a black pixel value equal to 0. For example, a particular scanner may have a white level of 255 but only a black level of between 30–50. In one embodiment, the levels may be chosen by calculating a histogram of the entire image and determining the best white level and black level. However, this requires two passes through the image. The two pass operation would decrease speed and may require an expensive frame buffer. In another embodiment, the levels may be chosen based on the characteristics of the scanner or the scanner characteristics plus other information like the user selected contrast controller present on copiers.

It should be noted that in the present invention using a black level and a white level that produce minimum MSE is not desirable. A minimum MSE solution might be to set the black level and the white level to be the same value. This solution would disable the subtraction of binary information of the present invention and decrease the MSE. Thus, the purpose of using the multistage system would be defeated.

After point spread module 303 performs the convolution, adder/subtracter 304 subtracts the "smoothed" binary image output from point spread module 303 from the original input image 310. Adder/subtracter 304 performs the subtracter on a pixel-by-pixel basis. In other words, each of the corresponding pixel values are subtracted from one another. Thus, adder/subtracter 304 produces a difference image.

Visual Masking In The Present Invention

The difference image is received by post subtraction processing module, or visual masking module, 305. The difference image contains large errors at binary edges where the location of an edge was slightly missed. No matter how well the smooth binary approximation image is created, it cannot perfectly match the input image. Edges in the original image can occur at any position while edges in the binary image are constrained to occur at discrete positions. The fractional pixel misalignment of edges between the input image and the approximation image creates high frequency difference image which is not handled well by JPEG. In other words, due to slight misalignment between the edges in the smoothed binary image and the original input image, the result of the subtraction process may produce portions of edges in the difference image. This is referred to as ringing. To eliminate the ringing, the present invention performs visual masking.

In the present invention, visual masking is performed by convolving the difference image with a low pass kernel at locations that are within a predetermined number of pixels of the true edge in the binary image when performing visual masking. In one embodiment, the convolution occurs at locations that are within two pixels of the true edge in the binary image. In the present invention, smoothing does not occur at artificial edges created at block boundaries. Smoothing does not occur at artificial edges created by block boundaries because the edge is not a true edge and JPEG can handle well edges on block boundaries. In effect, the unwanted high frequency components created by misaligned edges are being removed from the difference image.

The visual masking performed by visual masking module 305 causes the difference image to be smoothed at locations that correspond to edges in the binary image in order to eliminate the noise. For example, a 5×5 window may be used to find edges, such that smoothing occurs at locations where the corresponding pixel in the binary image is different from any of the closest 24 pixels. Since being extremely accurate is not critical, a small convolution kernel could be used to reduce hardware costs. For example, a 3×3 kernel with all values equal to 1 may be used.

Note that the smoothing does not result in a decompressed image that appears smooth because of the large contribution of high frequency energy from the binary image. The smoothing makes the edge in the reconstructed image more closely resemble the edge described by the smooth binary approximation image than the actual edge in the image. This increases MSE, but since the human visual system is not very sensitive to errors at the edges, these errors are not visible. This effect is called visual masking.

After being subjected to visual masking, the difference image is compressed with continuous-tone compressor 306, such as a JPEG compressor.

Summary of the Process of The Present Invention

FIG. 9 illustrates the compression process of the present invention. Referring to FIG. 9, initially the black level and white level of the input image for use when creating the binary image are determined. If the image dependent black level and white level are used, they must be transmitted to the decompressor. This step may be optional in that default values for the black level and white level may be already set up.

Next, processing continues at processing block 902 where a determination is made as to whether or not an 8×8 block contains an edge. For example, this can be determined heuristically where at least one pixel above 160/256 and at least one pixel below 96/256 indicates a block with an edge.

If a block contains an edge, then processing continues at processing block 903 where a binary estimate of the input image for the block is created. In one embodiment, this binary estimate is created using a threshold. In another case, the binary estimate for the entire block is the binary value closest to the mean of the block. Next, the estimated binary image is compressed using a binary encoder (processing block 904). The compressed estimated binary image is then transmitted or stored (processing block 905).

The estimated binary image (using the desired black level and white level) is convolved with an approximation for the point spread function (printer and scanner) at processing block 906. Convolution is not performed across artificial edges caused by adjacent blocks without edges (but with means above and below the threshold). Since being extremely accurate is not critical, a small convolution kernel could be used to reduce hardware costs. Also, since the input is binary, convolution can be performed with a small look-up table (LUT).

On a pixel by pixel basis, the convolved, estimated binary image is subtracted from the original image (processing block 907). A bias may be added to every pixel if necessary to prevent underflowing the pixel data type (processing block 908). In this manner, a difference image is created. It should be noted that the difference image appears as if the binary portions of the image have been mostly erased.

The difference image is convolved with a low pass kernel at locations that are within two pixels of the true edge in the binary image to take advantage of the visual masking (processing block 909). Since being extremely accurate is not critical, a small convolution kernel could be used to reduce hardware costs. For example, a 3×3 kernel with all values equal to 1 may be used. The difference image with visual masking is compressed with JPEG or some other continuous-tone image compression method (processing block 610).

The Decompression Method Of The Present Invention

The decompression method of the present invention is shown in FIG. 10. The binary compression information is initially decompressed using a binary decompression mechanism (processing block 1001). This results in a binary image. Note that knowledge of the black level and white level is required. The binary decompressed image is convolved with the approximation for the point spread function of the image as during compression (processing block 1002). The continuous-tone portion of the compressed data is then decompressed (processing block 1003). This constitutes the difference image. The binary images and difference images are then added together on a pixel by pixel basis and any bias previously added is subtracted (processing block 1004). The resulting image is a reconstruction, of the original image.

A block diagram of the decompressor of the present invention is shown in FIG. 11. Referring to FIG. 11, the compressed binary image data is coupled to be received by binary decompressor 1101 which decompresses the data to produce a binary image. The binary image is coupled to be received by point spread model 1102 which smoothes the image and inputs the smoothed image to adder/subtracter 1104. The compressed continuous-tone image data is coupled to be received by continuous-tone decompressor 1103, which decompresses the data to produce a continuous-tone image. Adder/subtracter 1104 adds the smoothed binary image to the continuous-tone image on a pixel-by-pixel basis to produce the reconstructed image. These components operate in the same manner as their counterparts in FIG. 3, except where noted.

Adjustable Parameters

Various parameters may be adjusted for particular applications to improve performance of the present invention. For instance, in the case of binarization heuristic, decreasing the edge mismatch artifacts improves compression quality. With respect to the white-gray-black thresholds, decreasing the edge mismatch artifacts improves compression quality. With respect to model base and other alternative codings for the binary image can be changed to improve binary compression. Adjusting the white and black levels for binary images can improve the JPEG compression/image quality. With respect to the point spread convolution kernel, matching scanner can improve JPEG compression/image quality. With respect to the visual masking convolution kernel, JPEG compression/image quality can be improved. Adjustments to the visual masking distance from the edge rule improves JPEG compression/image quality. Adjusting the JPEG quantization for a difference images improves the JPEG compression/image quality. Also, adjusting Huffman tables for difference images improves JPEG compression.

Color Images

Color images may be compressed by applying the multistage compression system of the present invention to each component separately. Systems employing JPEG typically use an opponent color space. The multistage compression of the present invention may perform better on data in an opponent color space. The edge information is typically concentrated in a luminance component, so the binary images representing the chrominance component should be more easily compressed. Thus, using the present invention on all components will result in good quality/compression for applications where edges in chrominance components are important, for example, when documents with color text are compressed.

Using the present invention on all components in a color image may not always be optimal. The limited amount of edge information in the chrominance component may not justify transmitting binary images for these components. Alternatively, the luminance component could be processed with the multistage compression scheme of the present invention and the chrominance component could be processed with JPEG alone. For documents where most text is black and white (color is used mostly for continuous-tone regions), the multistage approach of the present invention should be used only on luminance.

The choice of method for implementing color image multistage compression is application dependent. The multistage method is better than JPEG alone only when images contain edges that are not modeled well be JPEG. For JPEG, problematic edges are sharp transitions in 8×8 block. If the resolution and point spread of the scanner are such that edges are blurred over a significant fraction of an 8×8 block, the present invention does not provide any advantage. For cases where a high amount of blurring exists, perhaps the 8×8 block size used by JPEG may not be large enough to utilize most of the local correlation of the image for a high compression. Sub-sampling the image, compressing the image using the multistage approach of the present invention, and up-sampling after decompression might achieve better results than JPEG alone. The JPEG standard was intended for compression of images, not difference images. The default quantization and Huffman tables associated with JPEG are not optimal for difference images. JPEG quality versus compression might be improved by using different quantization. JPEG compression might be improved by using different Huffman tables.

Although JPEG is used in one embodiment, the multistage approach of the present invention might be utilized with other continuous-tone compressors, such as others sinusoided transform compressors, that have difficulty representing edges. The multistage approach of the present invention can be used with any block-based coding method, such as block truncation coding (BTC) or non-block-based coding method.

Hardware Implementations Of The Present Invention

FIG. 12 illustrates one embodiment of the binary extractor of the present invention. Referring to FIG. 12, the binary extractor 1200 is shown having memories 1201, 1203–1205 and 1208, binary image generator 1202, point spread model 1206, adder/subtracter 1207, and visual masking module 1209. The various small memories allow the system to process images received from a scanner without requiring a full frame buffer. Memory 1201 is coupled to receive the input image 1210 in raster order and delays input image 1210 so that thresholding of a block can occur after it has been classified as containing edges or not. In other words, memory 1201 is sized to accommodate one band of input image 1210. In one embodiment, where each block is 8 (pixels)×8 (pixels), memory 1201 is an 8 lines×8 pixels memory.

One input to binary image generator 1202 is coupled to the input image 1210. Binary image generator 1202 is also coupled to receive the delayed image data output from memory 1201. Binary image generator 1202 receives the original input image initially to determine the edge information (during the first pass). Memory 1201 then supplies the same image data to binary image generator 1202 for binarization (during the second pass). Memory 1205 operates in conjunction with binary image generator 1202, point spread model 1206, and visual masking module 1209. Memory 1205 stores status information for the blocks of data in input image 1210. In one embodiment, memory 1205 stores indications as to whether a particular block has a black pixel and whether a particular block has a white pixel. Memory 1205 may also include a count of the number of pixels which are one particular color. Memory 1205 provides data to point spread model 1206 and visual masking module 1209 to control the convolution operations. The data provided controls multiplexer logic responsible for ensuring that only the correct data is convolved. Specifically, the data provided indicates whether the block contains an edge.

Once the binary image generator 1202 generates the binary image of input image 1210, it is stored in memory 1203 to buffer the data before being input into the point spread convolver of point spread model 1206 and for visual mapping edge location in visual masking module 1209. The size of memory 1203 is determined by the size of the convolutions performed by point spread model 1206 and visual masking module 1209. Memory 1203 must be able to hold a number of lines equal to one less than the number of lines in the convolution operation performed by point spread model 1206 and equal to the size of edge search window performed by visual masking module 1209. In one embodiment, visual masking module 1209 uses a 5×5 window, while point spread model 906 performs only a 3×3 convolution. In this case, memory 1203 must be a 7 line×1 bit memory to supply visual masking module 1209 with the edge locations.

The output from memory 1201 is also input into memory 1204. Memory 1204 buffers the input image 1210 such that it is delayed. The delay produced by the data matches the delay of the point spread convolver in point spread model 1206, such that the inputs to adder/subtracter 1207 from both memory 1204 and the point spread model 1206 arrive at the same time. In other words, the delay of memory 1204 allows the pixels of input image 1210 to arrive at adder/subtracter 1207 at the same time as their corresponding smoothed pixels being output from point spread model 1206.

Once adder/subtracter 1207 performs the subtraction process, memory 1208 stores the difference image for input to the visual masking convolver of visual masking module 1209. In one embodiment, since visual masking module performs a 3×3 convolution, three lines of the image are required. Thus, memory 1208 comprises 2 line×8-bit memory such that two lines of the image may be sent with the current line of the image.

It should be noted that in one embodiment, memofides 1203, 1204 and 1208 could comprise a single memory having many data bits. This is due to memofides 1203, 1204 and 1208 being able to be addressed identically. Note also that if the amount of memory is too large to a single chip implementation (including the logic subcomponents), then an external first-in/first-out (FIFO) buffer may be used. In one embodiment, an external 8 bit×8 line FIFO could be used for memory 1201.

It should also be noted that binary extractor 1200 processes data in raster order to reduce the amount of intermediate memory required to perform the convolutions. Additional memory may be required in a system to provide the raster to block ordering required for JPEG.

One Embodiment of the Binary Image Generation Hardware

FIGS. 13A and 13B illustrate one embodiment of the binary image generation hardware of the present invention. The binary image generation hardware of the present invention determines which blocks contain edges and binarizes all blocks appropriately. Referring to FIG. 13A, binary image generation logic 1300 determines the blocks having edges and locates a representative binary value for the entire block. Binary image generation logic 1300 includes black, white, or gray threshold logic 1301, logic 1302 and 1303 and latch 1306, AND gate logic 1304 and counter 1305. Threshold logic 1301 is coupled to receive the three most significant bits (MSBs) of each pixel and generates two outputs. One of the outputs is coupled to the input of logic 1302, and one of the outputs is coupled to the input of logic 1303. Logic 1302 and 1303 each contain a flip-flop that is set when its input is asserted. The outputs of logic 1302 and 1303 are coupled to two inputs of AND gate logic 1304. The output of AND gate logic 1304 indicates whether the block contains an edge. The MSB of each pixel is also coupled to the enabling input of counter 1305. The overflow indication of counter 1305 is coupled to latch 1306. In one embodiment, the output of latch 1306 indicates the binary level for the entire block.

Binary image generation logic 1300 uses thresholds to determine whether there is edge information in a particular block. Binary image generation logic 1300 determines that an edge exists in a particular block by determining if there is a black pixel and white pixel in the block. Threshold logic 1301, logic 1302 and 1303, and AND gate logic 1304 determine whether a block of the input image contains an edge. In one embodiment, the blocks are 8×8 blocks. Threshold logic 1301 determines if there is a black and white pixel in a block by using thresholds. In other words, threshold logic 1301 thresholds the pixels. In the present invention, a threshold is set up to determine if a particular pixel is black and another threshold is set up to determine if a particular pixel is white. In one embodiment, the threshold values which threshold logic 1301 uses to threshold the pixels are chosen such that only the three most significant bits of each pixel need to be examined. In one embodiment, where pixel value range from 0–255, a pixel value of 96 or below is designated a black pixel, and a pixel value of 160 or above is designated as a white pixel. Any pixel value between 96 and 160 is designated as a gray pixel. An example of threshold logic 1301 is shown in Table 1.

TABLE 1

| Input (Most significant three bits of pixel, binary) | Black Output | White Output |
| --- | --- | --- |
| 000 | 1 | 0 |
| 001 | 1 | 0 |
| 010 | 1 | 0 |
| 011 | 0 | 0 |
| 100 | 0 | 0 |
| 101 | 0 | 1 |
| 110 | 0 | 1 |
| 111 | 0 | 1 |

Note that the present invention is not limited to threshold values of 96 and 160 and is also not limited to examining only a portion of each pixel.

If threshold logic 1301 determines that the block has a black pixel (e.g., a pixel has a value less than or equal to 96), then threshold logic 1301 generates an output which sets logic 1302. If threshold logic 1301 determines that the block has a white pixel (e.g., a pixel has a value greater than or equal to 160), then threshold logic 1301 generates an output which sets logic 1303. Logic 1302 and 1303 feed the inputs to AND gate logic 1304, such that if both logic 1302 and 1303 have been set by threshold logic 1301, then the output of AND gate logic 1304 will go high, thereby indicating that the block contains an edge. On the other hand, if either or both of logic 1302 and 1303 have not been set by threshold logic 1301, then the output of AND gate logic 1304 will be low, thereby indicating that the block does not contain an edge.

After the determination of whether a block contains edges is complete, pixels in the block are thresholded. In one embodiment, in blocks with edges, each pixel is thresholded independently; otherwise, the entire block is thresholded to one value. In one embodiment, for blocks with edges, if the threshold is 128/256, then individual pixels may be thresholded by outputting their most significant bit. In one embodiment, for blocks without edges, the MSB of each pixel can be used to find a representative threshold value. For example, if half of the pixels in a block have their MSB equal to 1, the block is thresholded to 1; otherwise, the block is thresholded to 0.

Binary image generation logic 1300 also determines a representative binary value for each block. In one embodiment, counter 1305 and latch 1306 indicate the binary level for the entire block. Counter 1305 counts the number of pixels in a block which are of a particular color designation (e.g., black, white, etc.). Counter 1305 is able to count up to a number which is one-half the number of pixels in a block. In one embodiment, where the blocks are 8×8, counter 1305 is a 5-bit counter which counts to 32. Counter 1305 is enabled using the MSB of the pixel. Each time a pixel in the block has their MSB equal to a 1, thereby indicating that the pixel is white, counter 1305 will be enabled and its count incremented by one. Each time a pixel in the block has their MSB equal to a 0, thereby indicating that the pixel is black, then counter 1305 will not be enabled and its count remains the same. If at least half of the pixels have a MSB of 1 (i.e., the block has more white pixels than black pixels), then counter 1305 produces an overflow condition. In other words, if a majority of the pixels have an MSB of 1, then an overflow condition occurs. The overflow condition is indicated by a signal which sets latch 1306.

Latch 1306 indicates the binary value for the entire block. Therefore, when latch 1306 is set due to the overflow of counter 1305, the output of latch 1306 is high, thereby indicating that the binary value for the entire block is thresholded to a 1 (i.e., white). On the other hand, if latch 1306 is not set because more than half of the pixels in the block has a MSB of 0 (i.e., more pixels were black), such that counter 1305 did not produce an overflow condition, then the entire block is thresholded to 0 (i.e., black).

Because the data is processed in raster order, the delay between the determination of which blocks contains edges and the thresholding is eight full lines of the image. In other words, the data is not processed one block at a time. It should be noted that the determination of which binary value is representative of an entire block is made at the same time the edge determination is made. In this manner, the information will be available when a thresholding is performed.

FIG. 13B illustrates the binarization logic 1320 of the binary image generation hardware. Referring to FIG. 13B, multiplexer (MUX) 1307 is coupled to receive the most significant bit (MSB) 1322 of the current pixel and a signal 1323 indicating the binary value for the entire block as inputs. A control signal 1321 indicating whether the block contains an edge controls what is output as the binary value for the pixel. If the block does not contain an edge, then MUX 1307 outputs signal 1323 indicating the binary value for the entire block as the binary value of the current pixel. If the block does contain an edge, then MUX 1307 outputs the MSB 1322 as the binary value for the pixel, such that all pixels in block with edges are thresholded to the value of their MSB.

Due to the raster order processing, the internal state of the binary extractor is saved and restored for each block. The decisions of which blocks contain edges must be saved for three rows of blocks. This information requires a 11 bit/block and is listed in Table 2.

TABLE 2

Binary Extractor State Information For Each Block

| Size | Purpose |
| --- | --- |
| 1 bit | A flag to indicate white pixel found in block |
| 1 bit | A flag to indicate black pixel found in block |
| 5 bits | Counter value |
| 1 bit | Binary level for entire block |
| 3 bits | Edge decision for previous three blocks |

Point Spread Model Hardware

One embodiment of a block diagram of the point spread model hardware is shown in FIG. 14. Referring to FIG. 14, point spread model hardware 1400 includes shift registers 1401–1403, look-up table (LUT) 1404, MUX control logic 1405 and MUX 1406. Each of the shift registers 1401–1403 are coupled to receive binary pixels. The outputs of shift registers 1401–1403 each comprise three bits which are coupled to the inputs of LUT 1404. The output of LUT 1404 is coupled to one of the inputs of MUX 1406. In one embodiment, the output of LUT 1404 comprises eight bits. The other inputs to MUX 1406 are a white level indication and a black level indication. The control input of MUX 1406 is coupled to the output of MUX control logic 1405. MUX control logic 1405 is coupled to receive an edge decision for the current and eight neighboring blocks (i.e., whether the blocks have an edge), the current position [0, 7] in the block in the X and Y directions, and the binary level representation of the entire block.

The point spread model hardware 1400 performs an area convolution on the binary image. In one embodiment, point spread model hardware 1400 performs a 3×3 convolution.

The 3×3 convolution may be performed between the pixel values in the binary image and a point spread model convolution kernel. In one embodiment, the convolution kernel comprises:

$$\frac{\begin{bmatrix} 1 & 1 & 1 \\ 1 & 1 & 1 \\ 1 & 1 & 1 \end{bmatrix}}{9}$$

In another embodiment, the following kernel may be used:

$$\frac{\begin{bmatrix} 1 & 1 & 1 \\ 1 & 2 & 1 \\ 1 & 1 & 1 \end{bmatrix}}{10}$$

Other size convolutions may be used which would result in different trade-offs between the hardware cost and the accuracy of modeling the image input device's point spread function. Since the input is binary, a 3×3 convolution can be performed using a 512×8-bit look-up table (e.g., LUT 1404) and appropriate logic to properly order the data. The output of LUT 1404 provides the data for a particular pixel. Shift registers 1401–1403 in conjunction with LUT 1404 represent the convolver for point spread model hardware 1400. Each of shift registers 1401–1403 receive one bit pixels from a line of pixels. In one embodiment, each of shift registers 1401–1403 send 3 pixels to LUT 1404. The middle pixel of shift register 1402 represents the pixel which is currently being subjected to the convolution. LUT 1404 receives the nine bits from shift register 1401–1403 as an address and outputs the data at the address. The convolved data represents the intensity value of the pixel.

The point spread model hardware of the present invention disables convolution across block boundaries with artificial edges. MUX 1406, under control of MUX control logic 1405, is responsible for disabling the convolution. If the current block contains an edge, then MUX control logic 1405 enables the convolved data as an output from MUX 1406. However, if the current block does not contain an edge, and if an adjacent block (in the convolution window) at the vertical edge of the block contains an edge, then MUX control logic 1405 enables the convolved data as an output from MUX 1406. If the current block does not contain an edge and an adjacent block (in the convolution window) at a horizontal edge of the block and the adjacent block contains an edge, then the convolved data is enabled. If the current block does not contain an edge and the binary level of representation of the entire block is white, then the white data is enabled. If the current block does not contain an edge nor an adjacent block contains an edge, nor the binary level representative of the entire block is black, then MUX control logic 1406 enables the black data to be output from MUX 1406.

It should be noted that point spread model hardware 1400 is also required for decompression.

One Embodiment of the Adder/Subtracter of the Present Invention

A block diagram of one embodiment of the adder/subtracter hardware of the present invention is shown in FIG. 15. The adder/subtracter hardware generates the difference image by subtracting the binary approximation image from the original input image. In one embodiment, the subtraction is performed by adding the inverse of the binary approximation image and a carry to the original input image.

Referring to FIG. 15, adder/subtracter hardware 1500 includes NOT logic 1501, carry save adder 1502 and carry propagate adder 1503. It should be noted that in another embodiment, a carry propagate adder could be used instead of the carry save adder. NOT logic 1501 is coupled to receive the binary approximation image 1511 and inverts the approximation image 1511 to facilitate performing a subtraction. The inverted binary approximation image data is coupled to one input of carry save adder 1502. Carry save adder 1502 is also coupled to receive the original input image 1510, and a bias 1512. Carry save adder 1502 generates two outputs to carry propagate adder 1503. Carry propagate adder 1503 which is coupled to receive the outputs from carry save adder 1502. Carry propagate adder 1503 in response to the two outputs from carry save adder 1502, outputs a difference image.

Carry save adder 1502 receives the original image and pixels relating to the approximation image which have been inverted. Carry save adder 1502 adds the pixel values in the original input image 1510 with the inverted pixel values of the binary approximation image 1511 and any bias to produce the difference image. Thus, carry save adder 1502 performs any necessary biasing to the results (i.e., the image pixel data) to ensure that it is positive. The output of carry save adder is the difference image and the carry signal. Carry propagate adder 1503 receives the difference image and the carry signals and adds them together.

Note that the biasing is required to compensate for the dynamic range limitations that may be encountered by the subtraction process. If the original image and the approximation image use 8-bit pixels, the pixel values range from 0–255. If a relationship did not exist between the original and the approximation images, a subtraction might result in values in the interval from −255 to 255 which would require nine bits to represent. In one embodiment, the result may be clipped if the expected value of the subtraction is in the range from −128 to 127. In another embodiment, a process for generating the approximation image could be analyzed to find a correct range and divide by the correct scaling factor to ensure the proper range of values. The correct scaling factor may be between 1 and 2.

Note that adder/subtracter 1500 is the same hardware that is required for decompression with the exception that no inversion of the approximation image (i.e., the binary image) is required.

One Embodiment of the Visual Masking Hardware of the Present Invention

A block diagram of one embodiment of the visual masking hardware is shown in FIG. 16. Referring to FIG. 16, visual masking module 1600 comprises registers 1601–1603, adder tree 1604, MUX control logic 1605 and MUX 1606. Registers 1601–1603 each is coupled to receive to 8-bit pixels and output three 8-bit pixels each which are coupled to the inputs of adder tree 1604. The output of adder tree 1604 is the convolved data output. The convolved data output is coupled to one input of MUX 1606. The other input of MUX 1606 is coupled to the unconvolved data. The unconvolved data is just the pixel value. MUX 1606 is controlled by a control input which is output from MUX control logic 1605. The inputs to MUX control logic 1605 are the same as those inputs of the MUX control logic of the point spread model (edge decision, current X, Y position, block, block binary level).

Registers 1601–1603 and adder tree 1604 comprise the convolver for visual masking module 1600. Registers 1601–1603 supply the pixel data to adder tree 1604 to perform the convolution. In one embodiment, each of registers 1601–1603 receive 8-bit pixels. Adder tree 1604 performs the convolution between the pixel values in the difference image and the visual masking convolution kernel and outputs the convolved data. In one embodiment, the convolution kernel comprises:

$$\frac{\begin{bmatrix} 1 & 1 & 1 \\ 1 & 1 & 1 \\ 1 & 1 & 1 \end{bmatrix}}{9}$$

The above convolution kernel requires a non-trivial division. In another embodiment, an asymmetric kernel may be used, such as:

$$\frac{\begin{bmatrix} 1 & 2 & 2 \\ 2 & 2 & 2 \\ 2 & 2 & 1 \end{bmatrix}}{16}$$

This convolution kernel allows for multiplications and divisions to be reduced to trivial shifts. For instance, since the division is by 16, the division can occur by simply dropping the first four bits.

Figure 17:
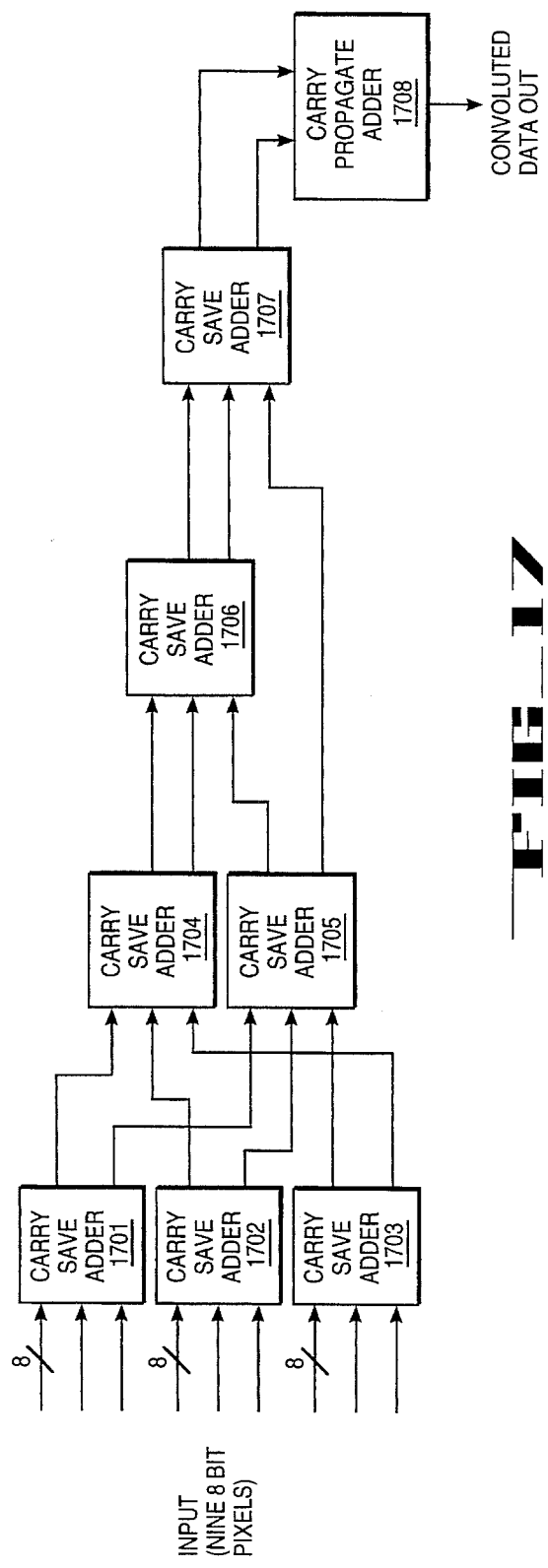
FIG. 17 illustrates an adder tree used to perform the convolution of the present invention.

One embodiment of adder tree 1604 used to perform the convolution is shown in FIG. 17. Referring to FIG. 17, adder tree 1704 comprises carry save adders 1701–1707 and carry propagate adder 1708. Each of carry save adders 1701–1707 adds the data on the inputs and outputs a set of sum signals and a set of carry signals. The operation of a carry save adder is well-known in the art. Each of carry save adders 1701–1703 are coupled to receive the three 8-bit pixels data from registers 1601–1603 respectively. The sum signals output from carry save adder 1701 are coupled to be received as an input to carry save adder 1704. The carry signals output from carry save adder 1701 are coupled to be received by an input of carry save adder 1705. The sum signals output from carry save adder 1702 are coupled to an input of carry save adder 1704, and the carry signals output from carry save adder 1702 are coupled to an input of carry save adder 1705. The sum signals output from carry save adder 1703 are coupled to an input of carry save adder 1704, while the carry signals output from carry save adder 1703 are coupled as inputs to carry save adder 1705. Both the sum signals and the carry signals output from carry save adder 1704 are coupled as inputs to carry save adder 1706. The sum signals output from carry save adder 1705 are coupled as an input to carry save adder 1706. The carry signals output from carry save adder 1705 are coupled as an input to carry save adder 1707. The other two inputs of carry save adder 1707 are coupled to the sum signals and carry signals output from carry save adder 1706. Both the sum signals and the carry signals output from carry save adder 1707 are coupled as inputs to carry propagate adder 1408, which adds the two sets of signals together in a manner well-known in the art. The output of carry propagate adder 1408 is convolved data output.

Referring back to FIG. 16, the output of adder tree 1604 is a convolved data and is input into MUX 1606. MUX 1606 enables convolution only near the true edges of the image. In other words, since the present invention does not perform visual masking over artificial edges, MUX 1606 is responsible for disabling the convolution across block boundaries with artificial edges.

MUX control logic 1605 controls MUX 1606. If the current block contains an edge, then MUX control logic 1605 enables the convolved data. If the current block doesn't have an edge, but a block at the horizontal or vertical edge of the block does contain an edge, then the convolved data is enabled. If the current block or any adjacent block does not contain an edge, then MUX control logic 1605 enables the unconvolved data. For instance, if MUX control logic 1605 considers a 5×5 region in the binary image, MUX control logic 1605 only enables convolved data when the pixel in the center of the 5×5 region is different from at least one of the other pixels in the region. Pixels from blocks that were not classified as containing edges are not considered.

The present invention provides an image compression scheme that provides enhanced performance for compressing images of documents (text with continuous-tone images). The present invention uses multiple compression methods each designed for compressing a specific portion of a document image. Furthermore, the image compression scheme of the present invention does not require explicit segmentation.

Whereas many alterations and modifications of the present invention will no doubt become apparent to a person of ordinary skill in the art after having read the foregoing description, it is to be understood that the particular embodiment shown and described by way of illustration is in no way intended to be considered limiting. For instance, the present invention could be implemented using field programmable gate arrays (FPGAs). Therefore, references to details of the preferred embodiment are not intended to limit the scope of the claims which in themselves recite only those features regarded as essential to the invention.

Thus, a method and apparatus for compressing and decompressing document images has been described.

I claim:

1. A method for compressing an input image comprising the system-implemented steps of:

the system generating a binary image having edge information and representing an estimate of the bi-level information in the input image;

the system filtering the binary image to produce a processed binary image;

the system subtracting the processed binary image from the input image on a pixel-by-pixel basis to produce a difference image;

the system reducing components in the difference image created by mismatching between binary edges in the processed binary image and the input image to produce a resulting image, wherein the step of the system reducing components comprises removing portions of edges produced in the difference image created by fractional pixel misalignment between binary edges in the input image and the processed binary image;

the system compressing the binary image and the resulting image to create a compressed data stream, wherein the step of compressing comprises the system-implemented steps of compressing the binary image into compressed binary data; and compressing the resulting image into compressed continuous-tone data, such that the input image is compressed into compressed binary data and compressed continuous-tone data.

2. The method defined in claim 1 wherein the filtering the binary image comprises the step of modeling the binary image with a point spread function of the source of the input image to produce a smoothed image.

3. The method defined in claim 2 wherein the step of modeling comprises performing an area convolution on the binary image with an approximation of the point spread function to produce the smoothed image.

4. The method defined in claim 1 wherein the step of reducing comprises the step of filtering the difference image with a visual masking filter.

5. A method for compressing an image having a plurality of pixels, wherein each of the plurality of pixels has a pixel value, said method comprising the system-implemented steps of:

the system producing an estimated binary image, wherein the step of producing an estimated binary image comprises the steps of determining whether each block in the image includes edge information, binarizing all blocks according to whether or not the blocks contain edges to produce the estimated binary image, wherein the step of binarizing comprises the steps of if a block contains edge information, then the system thresholding pixels in the block based on pixel values and a selected threshold level for a black pixel and a white pixel, and if the block does not contain edge information, then using a binary value representative of the entire block as a binary estimate for the block;

the system producing a convolved binary image by convolving the estimated binary image with an approximation for a point spread function to smooth edges across adjacent blocks;

the system producing a difference image by subtracting the convolved binary image from the input image on a pixel-by-pixel basis;

the system producing a convolved difference image by convolving the difference image with a low pass kernel at locations that are within a predetermined number of pixels of true edges in the binary image, wherein the step of producing a convolved difference image removes portions of edges caused by fractional pixel misalignment during subtraction of the convolved binary image from the input image; and the system compressing the binary image and the convolved difference image to create a compressed data stream, wherein the step of compressing comprises the system-implemented steps of the system compressing the estimated binary image into compressed binary data, and the system compressing the convolved difference image into compressed continuous-tone data with a continuous-tone image compressor, such that the input image is compressed into compressed binary data and compressed continuous-tone data.

6. A decompression method for decompressing compressed image data into a reconstructed version of the original image having a plurality of pixels, wherein each of the plurality of pixels has a pixel value, said method comprising the system-implemented steps of:

obtaining compressed binary image data and compressed continuous-tone image data from memory;

the system decompressing the compressed binary image data to produce a binary image having a first plurality of pixels;

the system producing a smoothed binary image by filtering the binary image;

the system decompressing the compressed continuous-tone image data to produce a continuous-tone image having a second plurality of pixels equal in number to the first plurality of pixels; and the system combining the smoothed binary image and the continuous-tone image on a pixel-by-pixel basis to produce a reconstructed version of the original image.

7. A decompression method for decompressing compressed image data comprising the system-implemented steps of:

the system obtaining compressed binary image data and compressed continuous-tone image data from a memory;

the system decompressing the compressed binary image data using a JBIG compressor to produce a binary image having a first plurality of pixels;

the system performing an area convolution on the binary image using an approximation of a point spread function of the source of the original image to create a smoothed binary image;

the system decompressing the compressed continuous-tone image data to produce a continuous-tone image having a second plurality of pixels equal in number to the first plurality of pixels; and the system combining the smoothed binary image and the continuous-tone image on a pixel-by-pixel basis to produce a reconstructed version of the input image, such that mosquito noise is reduced.

8. The decompression method defined in claim 7 wherein the area convolution is not performed when two adjacent blocks do not contain edge information.

* * * * *